United States Patent [19]

Scott et al.

[11] 4,285,019
[45] Aug. 18, 1981

[54] CONTOURED MAGNETIC RECORDING HEAD/SLIDER ASSEMBLY

[75] Inventors: John C. Scott, Saratoga; Raymond Herrera, Santa Clara, both of Calif.

[73] Assignee: Memorex Corporation, Santa Clara, Calif.

[21] Appl. No.: 129,142

[22] Filed: Mar. 10, 1980

[51] Int. Cl.³ .................... G11B 5/60; G11B 17/32; G11B 21/20
[52] U.S. Cl. .................... 360/103; 360/122
[58] Field of Search ........... 360/103, 102, 122, 128

[56] References Cited

U.S. PATENT DOCUMENTS

| | | | |
|---|---|---|---|
| 3,193,835 | 7/1965 | Wadey | 360/103 |
| 3,249,701 | 5/1966 | Silver | 360/103 |
| 3,528,067 | 9/1970 | Linsley | 360/103 |
| 3,678,482 | 7/1972 | Billawala | 360/103 |
| 3,732,552 | 5/1973 | Walraven | 360/103 |
| 3,823,416 | 7/1974 | Warner | 360/122 |
| 3,922,776 | 12/1975 | Alger et al. | 360/103 |
| 3,956,770 | 5/1976 | McWhinnie et al. | 360/103 |
| 3,990,106 | 11/1976 | Kameyama et al. | 360/103 |
| 4,071,864 | 1/1978 | Zapala | 360/103 |

*Primary Examiner*—Alfred H. Eddleman
*Attorney, Agent, or Firm*—Limbach, Limbach & Sutton

[57] ABSTRACT

A magnetic head/slider assembly for flying a magnetic head on a fluid bearing relative to magnetic recording media moving in a predetermined direction, as a fluid bearing surface which is convexly curved longitudinally of the assembly. A magnetic recording head extends rearwardly of the slider body with at least a portion of its bottom surface also being convexly curved. The head/slider assembly is supported such that the portion of the assembly closest to the magnetic recording media when the media is stopped is a portion of the slider body forward of the trailing edge thereof, whereby the magnetic head gap remains spaced above the media when the media contacting portion of the assembly is resting thereupon.

6 Claims, 12 Drawing Figures

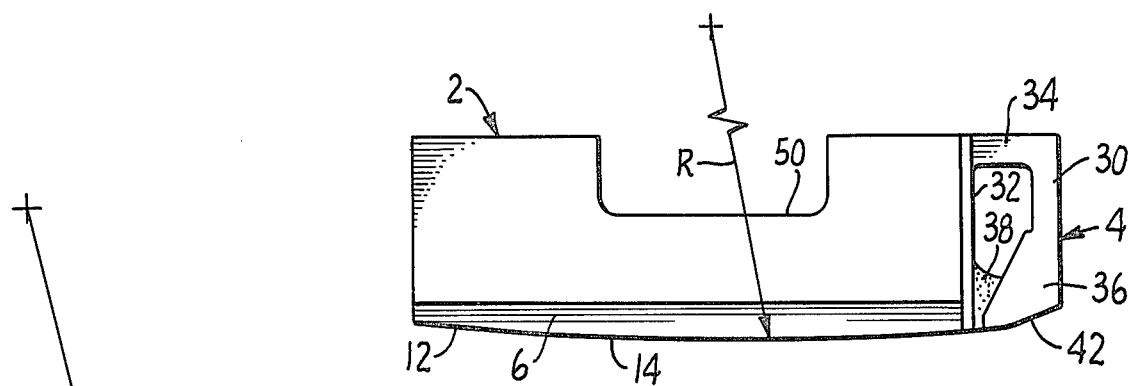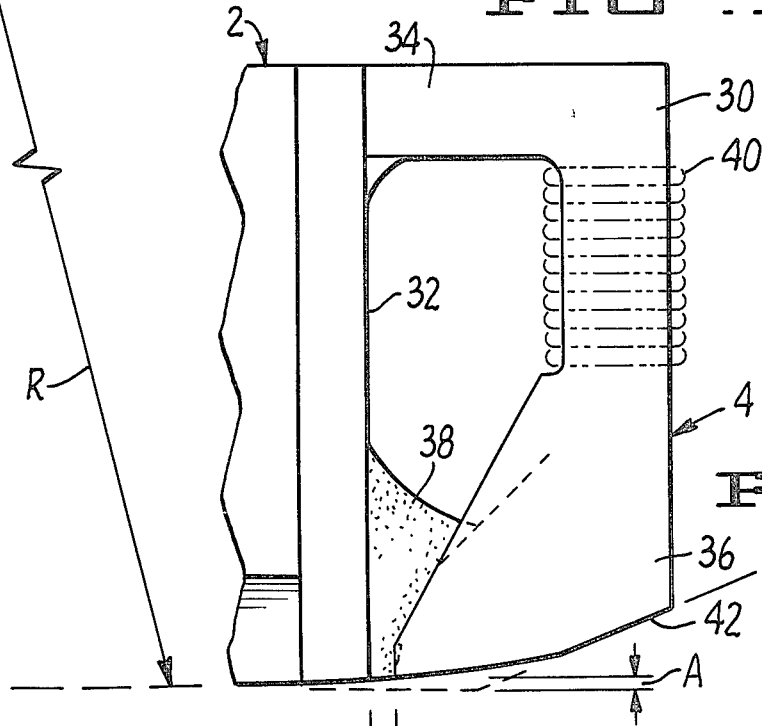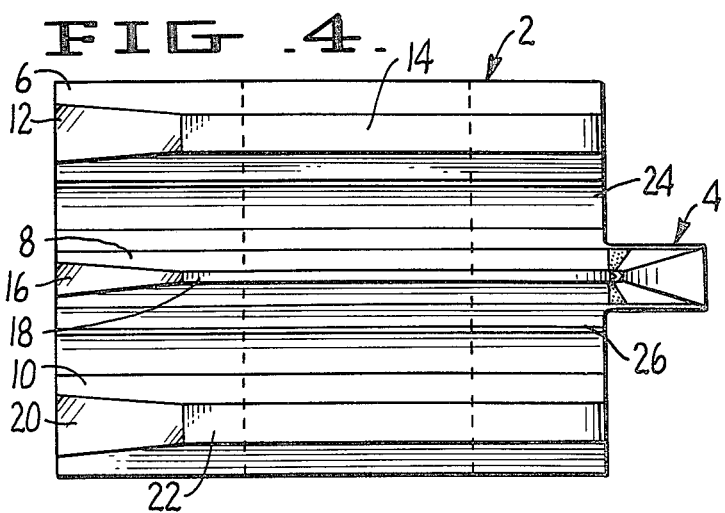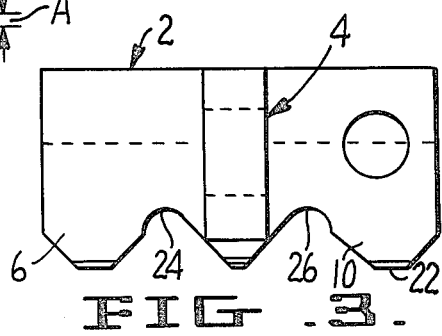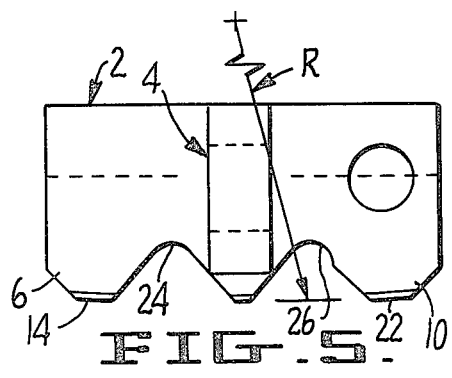

CONTOURED MAGNETIC RECORDING HEAD/SLIDER ASSEMBLY

BACKGROUND OF THE INVENTION

In the magnetic recording art, particularly that directed to recording on rotating magnetic discs such as are commonly used in the data processing field, it is well known to utilize assemblies which support the magnetic recording head or transducer on the moving film of air entrained with the moving media. In more recent equipment utilizing what is known as "Winchester" technology, it is well known to utilize a slider to carry the magnetic heads, with this slider being configured to provide the necessary support on the fluid bearing created by the moving media. Numerous configurations of such head/slider assemblies have been developed and utilized, including those illustrated in various United States patents, such as U.S. Pat. No. 3,855,625 to Garnier et al. and U.S. Pat. No. 3,823,416 to Warner. Each of these structures, along with numerous others, have provided for more or less satisfactory operation. However, each of them has suffered from various disadvantages resulting both from their configurations and from their operating characteristics.

In the prior art the slider bodies have each included an extended, planar or flat portion which cooperates with the film of air entrained with the moving media to provide an air bearing supporting the slider and the magnetic head attached thereto some distance above the surface of the media. In these prior art structures these flat fluid bearing surfaces have extended rearwardly and having included as a portion thereof the lowermost surface of the magnetic transducer along with its read/write gap. Since the gap, along with the remainder of the head or transducer, extends rearwardly from the back edge of the slider, the head and gap are placed lower than any portion of the slider when the leading edge of the slider is tilted upwardly as occurs during operation when the head and slider are flying above the media. Since the head and gap are lower than any portion of the slider, any dust, grit or other foreign objects on the surface of the media will tend to strike and possibly damage the head, if it strikes any portion of the head/slider assembly. Additionally, when the head/slider assembly lands, as when the movement of the media is slowed and stopped, the first portion of that assembly which contacts the surface of the media again is the head and its gap, thus tending to cause abrasion and undesirable wear and possible damage to the head and the read/write gap causing degradation of the magnetic recording performance of the head. Heretofore, that has been considered simply a normal disadvantage of the flying head/slider assemblies which are used in the contact start/stop mode. Methods of lubricating disc surfaces do not overcome this physical structure defect.

SUMMARY OF THE INVENTION

In view of the disadvantages of the prior art head/slider assemblies, it is an object of the present invention to provide an improved head/slider assembly in which the magnetic transducer and its read/write gap are better protected from damage and wear during operation and initial start/stop conditions.

It is a further object of this invention to provide such an assembly in which, when the assembly is flying above the media, the lowermost portion of the magnetic transducer and its read/write gap are not significantly lower than the lowermost portion of its associated slider.

It is yet another object of this invention to provide such a head/slider assembly in which, when the relative movement between the media and the assembly is stopped to permit the assembly to land on the surface of the media, the magnetic transducer and its gap are displaced above the surface of the media when the fluid bearing surface of the slider is at rest upon the media.

To achieve these and other important objects of this invention, which will become more apparent from the following detailed description of a preferred embodiment, there is provided a magnetic head/slider assembly for flying a magnetic head on a fluid bearing relative to magnetic recording media moving at a predetermined direction in the fluid, with the head/slider assembly including a slider body having leading and trailing edges with respect to such relative movement and at least one magnetic head including a read/write gap affixed to the slider body and extending rearwardly of the trailing edge thereof. The slider body has a bottom surface facing the media and extending longitudinally of the slider body with at least a portion of that bottom surface forming a fluid bearing surface which is convexly curved in the longitudinal direction from the slider body trailing edge to a point forward thereof. The bottom surface of the magnetic head is also convexly curved in the longitudinal direction from the slider body trailing edge to a point rearward thereof. The head/slider assembly is supported such that the portion of the assembly closest to the media when the movement of the media is stopped is a portion of the slider body forward of the trailing edge, whereby the magnetic head remains spaced above the media when the media-contacting portion of the assembly is resting on the media surface to protect the read/write gap from contact with the media.

BRIEF DESCRIPTION OF THE DRAWINGS

A particularly preferred embodiment of the head/slider assembly of this invention will be described in detail with respect to the accompanying drawings in which:

FIG. 1 is an enlarged side elevational view of the head/slider assembly of this invention;

FIG. 2 is an enlarged fragmentary view of the rear portion of the assembly of FIG. 1;

FIG. 3 is a rear elevation of the assembly of FIG. 1;

FIG. 4 is a bottom plan view of the assembly of FIG. 1;

FIG. 5 is a rear elevation of a second preferred embodiment of the assembly of the invention;

DESCRIPTION OF A PREFERRED EMBODIMENT

Figure 6:
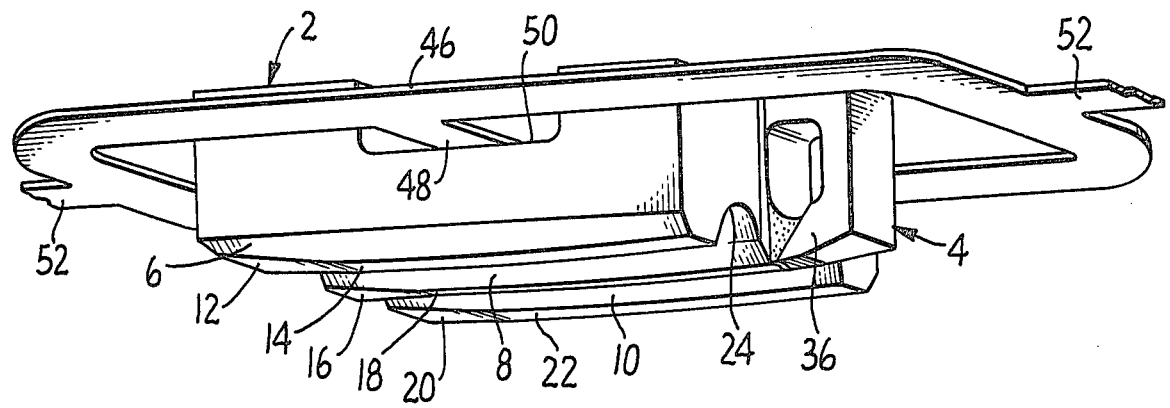
FIG. 6 is a lower perspective view of the assembly of FIG. 1.
Figure 7:
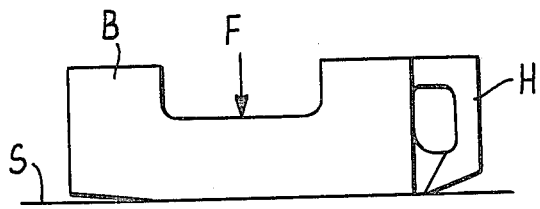
FIGS. 7 through 9 are schematic illustrations of the manner of operation of related prior art head/slider assemblies.

FIGS. 1, 3, 4 and 6 generally illustrate a particularly preferred embodiment of the head/slider assembly of the present invention. These illustrations are of such a device at a considerably enlarged scale for purposes of illustrations, since the actual devices may be only about one quarter of an inch long, or less.

This embodiment of the invention is generally similar in overall configuration to the head/slider assembly disclosed in detail in U.S. Pat. No. 3,823,416 and is of the configuration generally referred to as the three-rail or trimaran. The assembly comprises, generally, the slider body 2 and the magnetic transducer 4 attached to the trailing edge of that slider body.

Slider body 2 is formed of a suitable material, such as ferrite, and includes three downwardly depending longitudinal rails 6, 8 and 10 which are parallel to and generally level with one another. At least a portion 14, 18 and 22 of the bottom of each rail 6, 8 and 10 are convexly curved from the trailing edge to a point forward thereof. Preferably, this curvature may be cylindrical about an axis which extends transverse to the slider body and generally parallel to the plane of the recording media, and which axis is spaced well above the slider body. The cylindrical curvature may be very gradual, suitably being defined by a radius R of some fifty inches on this slider which may be on the order of 0.22 inches long. The axis may suitably be positioned about mid-way between the front and rear of the slider body 2.

The convex curvature of the slider body preferably may be continuous from the rear of the slider body to a point near the front thereof. Alternatively, the convex curvature may extend only part way to the center of the body from both the front and the rear thereof, providing for a flat planar area in the center with the curved portions at the edges thereof. At the front of each rail additional beveled surfaces 12, 16 and 20 may be provided, angling upwardly from the convexly curved portions 14, 18 and 22, as shown in FIGS. 1, 4 and 6.

As shown most clearly in FIG. 4, the outside rails 6 and 10 are located adjacent the outer extremities of the slider body 2 and are wider than the width of the center rail 8, so as to provide substantially the entire air bearing surface. The three rails are separated by bleed slots 24 and 26, which provide paths for the undesired air to bleed off from the air bearing outside rail surfaces during flying operations without contributing to the effective air bearing surface of the slider or changing the flying height thereof.

Transducer 4 comprises a magnetic core 30, which is formed into a generally C-shaped configuration, and which may be formed of generally the same ferrite material as the slider body 2. The core 30 may suitably be glass bonded to the trailing edge 32 of the slider body 2 in longitudinal alignment with the center rail 8. Upper leg portion 34 of the core is greater in cross-sectional area than the tapered lower leg portion 36, which forms the transducing gap, a substantial portion of which is filled with bonding glass 38. A suitable excitation winding 40 is provided, as illustrated in phantom in FIG. 2. Also as shown most clearly in FIG. 2, the bottom surface of the head 4 is also convexly curved in the longitudinal direction from the slider body trailing edge to a point rearward thereof. Suitably, this convex curvature is an extension of the cylindrical curvature defined by the radius R that forms the convex configuration of the air bearing support rails. An additional, upwardly beveled area 42 may be provided in the rearmost portion of the head.

The desired, convexly curved configuration of the air bearing support rails and the magnetic head of this embodiment preferably provide for a smoothly blended and continuous curved surface along the bottom rails and extending continuously at least part way back along the magnetic head bottom surface beyond the read/write gap G. As noted above, in an alternative embodiment the convexly curved configuration may be formed at the forward and rearward edges of a planar or flat portion of the bottom of the slider.

FIG. 5 illustrates a slight variation on the embodiment of FIGS. 1 through 4, in which the lower surface of the slider body rails and of the portion of the magnetic head 4 are provided with a curvature which is generally spherical instead of the cylindrical curvature of FIGS. 1 through 4. Suitably, this spherical radius R may be substantially the same as the cylindrical radius described above, and may be taken about a point on the same axis which is generally centered with respect to the lateral edges of the slider body. While the cylindrical curvature may be slightly preferable from a functional standpoint, such a spherically curved lower surface of the slider and head assembly has the practical advantage of simpler manufacture, since it may be formed through conventional lens grinding and lapping techniques used for forming convex lenses. Nonetheless, while only cylindrically and spherically curved embodiments are illustrated, it is to be understood that numerous other variations on convex curvature may be used equally well within the scope of this invention, and are to be included therein.

As illustrated in FIG. 6, the head/slider assembly of the present invention may be conventionally supported within a known type of flexure mount 46, in which a transversely extending torsion arm 48 is attached to the notch 50 in the top portion of the slider body 2. The flexure in turn may be mounted, suitably by the extension 52 extending longitudinally outwardly thereof to a conventional support arm. This suspension system, well known in the art, provides stiffness in a plane parallel to the recording media, which is the plane of accessing and frictional forces. However, the flexure mounting will permit the head to pivot about both the axis defined by the cross member 48 and that defined by the tabs 52, when torsional stresses are applied through the head, as by the air bearing during flying. This mounting arrangement is attached to the head/slider assembly such that the portion of the assembly closest to the recording media when the movement of the media is stopped is a portion of the slider body forward of the trailing edge, by virtue of the convex curvature of the air bearing surfaces of the slider body 2. This mounting arrangement provides, as illustrated in FIG. 2, for the magnetic head and its read/write gap G to remain spaced above the media some distance D when the media contacting portion of the assembly, the lowermost portion of the convexly curved rails, is resting on the media surface. By this arrangement, the read/write gap is spaced from contact with the media and is thus protected from the abrasive effects of the media moving at slow speed.

The flying characteristics, and advantages, of the present invention compared with the prior art, such as Warner U.S. Pat. No. 3,823,416, are shown in the parallel sets of FIGS. 7 through 9 and 10 through 12. With the prior art, such as Warner, the bottom surfaces of the air bearing rails have taper-flat configuration, with most of the rail being flat from its juncture with the forward tapered portion all the way to a point past the read/- write gap. In this prior art structure the read/write gap is essentially co-planar with the bottom of the rails, and thus rests upon the media when the rails themselves are resting upon the media.

Figure 8:
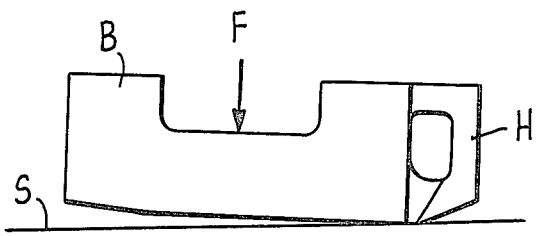

As shown in FIG. 8, when the media surface S begins to move faster and faster, thus creating an entrained layer of air to coact with the bottom rails of the slider and provide an air bearing arrangement, the forward portion of the slider body B will begin to rotate upwardly as it begins to take off from the media surface S. This rotation then causes the magnetic head H, and its read/write gap, to become the last portions of the head/slider assembly to lift off the media surface S. During this time, substantially all abrasive contact with the media surface is placed upon the head and its gap, thus exposing them to substantial wear.

Figure 9:
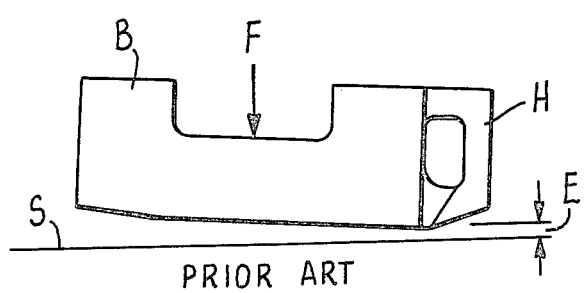

When the head is fully flying, as illustrated in FIG. 9, it remains at a slightly pitched up attitude, as illustrated. In this attitude, the head and its gap are still the points of closest contact of the assembly with the media surface, with the head being somewhat closer to the media surface than any portion of the slider body. Thus, any particles of grit, dust or other foreign matter on the moving media surface that are larger than the flying height E will crash into the head and its gap, likely causing serious damage to both the head and the media.

Figure 10:
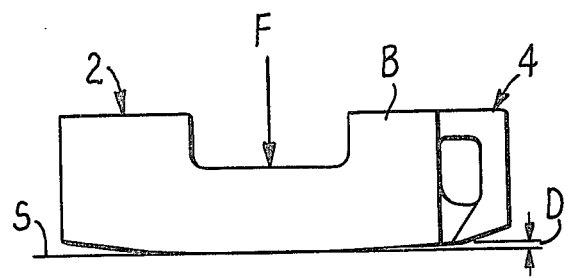
FIGS. 10 through 12 are schematic representations, corresponding generally to those of FIGS. 6 through 8, illustrating the manner of operation of the head/slider assembly of the present invention.
Figure 11:
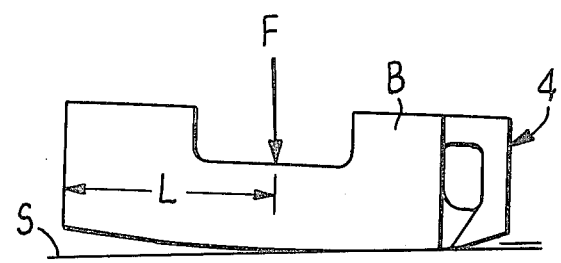
Figure 12:
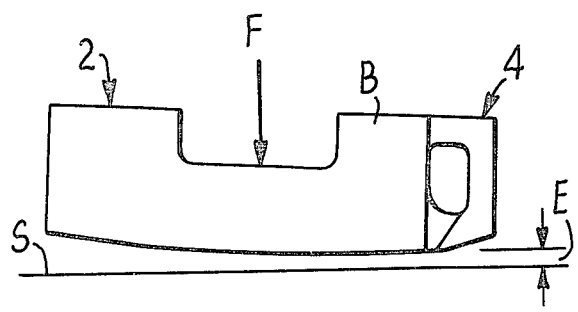

In contrast, a head/slider assembly according to the present invention is illustrated in FIGS. 10 through 12. Due to the convexly curved fluid bearing surface of the slider rails, this improved head/slider assembly will not land flat on the media surface S in the manner of the prior art, but will contact it over a substantially reduced area, approximating line contact. As illustrated in FIG. 10, and also FIG. 2, this improved assembly when resting on the media surface S under the influence of loading force F from the flexure and suspension will contact the media surface S at a point generally around the center of a slider body B. This is occasioned by the general manner of mounting the slider to its flexure such that the portion of the assembly closest to the media when it is stopped is a portion of the slider forward of the trailing edge thereof. As described above, this contact of the slider body with the immediate surface S, along with the above described convexly curved bottom surface of the slider body 2 and the head 4 will place the sensitive head gap a small distance D above the surface S of the media, thus protecting the gap from abrasive engagement with the media surface.

As the media begins moving and picking up speed (or as it slows to a stop), as when rotation of a recording disc is initiated, fluid, such as the air, entrained with the media surface S begins to establish the air bearing support which cooperates with the fluid bearing surfaces on the bottoms of the rails of the slider body 2. The force F which loads the head/slider assembly toward the media surface is centered at a position L along the slider body such that the head/slider assembly will rotate bringing its leading edge upward during this take-off procedure from the media surface S. The positioning of the loading force F is selected in a manner well known and easily determined by minor experimentation with any selected assembly design, to bring the recording gap to a position in which the gap is the portion of the assembly closest to the moving media at the moment of take-off and during the continued flying of the head, as illustrated in FIGS. 11 and 12. Such positioning of the loading force simply involves placing the force an easily determined distance behind the center of lift of the fluid bearing on the slider body fluid bearing surface. By this arrangement conventional control of the flying height E of the assembly above the disc surface S will place the recording/playback gap at the desired optimum operating position with respect to the magnetic media surface. By this positioning, with the gap closest to the media surface, but essentially tangent to a line parallel with that surface, it may be seen that any foreign objects on the disc or media surface large enough to cause interference and potential damage to the head will first strike a portion of the slider body fluid bearing support rails, thus tending to move the sensitive gap out of the way of any such foreign object. By this arrangement the gap is further protected against damage.

The operation of the alternative preferred embodiment described above combines features of both the prior art and of the present invention. Like the prior art, it provides a flat or planar portion for landing on the media, and thus distributing pressure from the loading force over a larger area. However, unlike the prior art and like the present invention, it also provides the convex curvature which spaces the gap above the media surface upon landing and provides greater protection and enhanced operating characteristics as compared with the prior art devices. From the foregoing description of the novel configuration and the manner of mounting and operating the improved head/slider assembly of this invention, it is apparent that this structure provides such an assembly which is less susceptible to damage and wear of the sensitive recording head gap than is the prior art. This arrangement provides such improved protection not only during the flying operation, but, importantly, during the landing and taking-off stages of the operation, when the slider body contacts the moving media surface and thus experiences potential abrasion.

While the foregoing describes a particularly preferred embodiment of the improved magnetic head/slider assembly of the present invention, it is to be recognized that such description is intended to be illustrative only of the principles of this invention, and is not to be considered limitative thereof. Since numerous variations and modifications, all within the scope of the present invention, will readily occur to those skilled in the art, the scope of the invention is to be limited solely by the claims appended hereto.

What is claimed is:

1. A magnetic head/slider assembly for flying a magnetic head on a fluid bearing relative to magnetic recording media moving in a predetermined direction in the fluid, comprising a slider body having leading and trailing edges with respect to such relative movement and a bottom surface facing said media and extending longitudinally of said slider body with at least a portion of said bottom surface forming a fluid bearing surface which is convexly curved in the longitudinal direction from said trailing edge to a point forward thereof, and at least one magnetic head including a read/write gap affixed to said slider body and extending rearwardly of the trailing edge thereof, the bottom surface of said head being convexly curved in said longitudinal direction from said slider body trailing edge to a point rearward thereof, said head/slider assembly being supported such that the portion of said assembly closest to said media when the movement of said media is stopped is a portion of said slider body forward of said trailing edge, whereby the magnetic head remains spaced above the media when the media-contacting portion of the assembly is resting on the media surface to protect the read/write gap from contact with the media.

2. The assembly of claim 1 wherein the curvature of said slider body bottom surface is generally cylindrical about an axis transverse to said slider body and generally parallel to the plane of said recording media.

3. The assembly of claim 1 wherein the curvature of said slider body bottom surface is generally spherical about a point spaced above said slider body.

4. The assembly of any of claims 1, 2, or 3 wherein said slider body curved surface and said magnetic head curved surface comprise portions of a surface having a continuous convex curvature.

5. The assembly of claim 1 wherein said slider body is mounted to a flexure for pivotal movement about an axis transverse to said slider body and generally parallel to the surface of said media, said pivot axis being positioned behind the center of lift of said fluid bearing on said slider body fluid bearing surface such that the lifting force of said fluid bearing against said slider body fluid bearing surface will pivot said head/slider assembly, when flying, to bring said gap to a position in which said gap is the portion of said assembly closest to the moving media.

6. The assembly of any of claims 1, 2 or 3 wherein at least a portion of said slider body bottom surface, intermediate said leading and trailing edges thereof, is substantially flat with at least part of said convexly curved portion extending between said flat portion and said slider body trailing edge.

* * * * *